May 16, 1967
J. S. WILSON
3,319,924
DIFFERENTIAL PRESSURE INDICATOR AND PNEUMATIC CONTROL
SYSTEM INCORPORATING THE SAME
Filed July 1, 1964
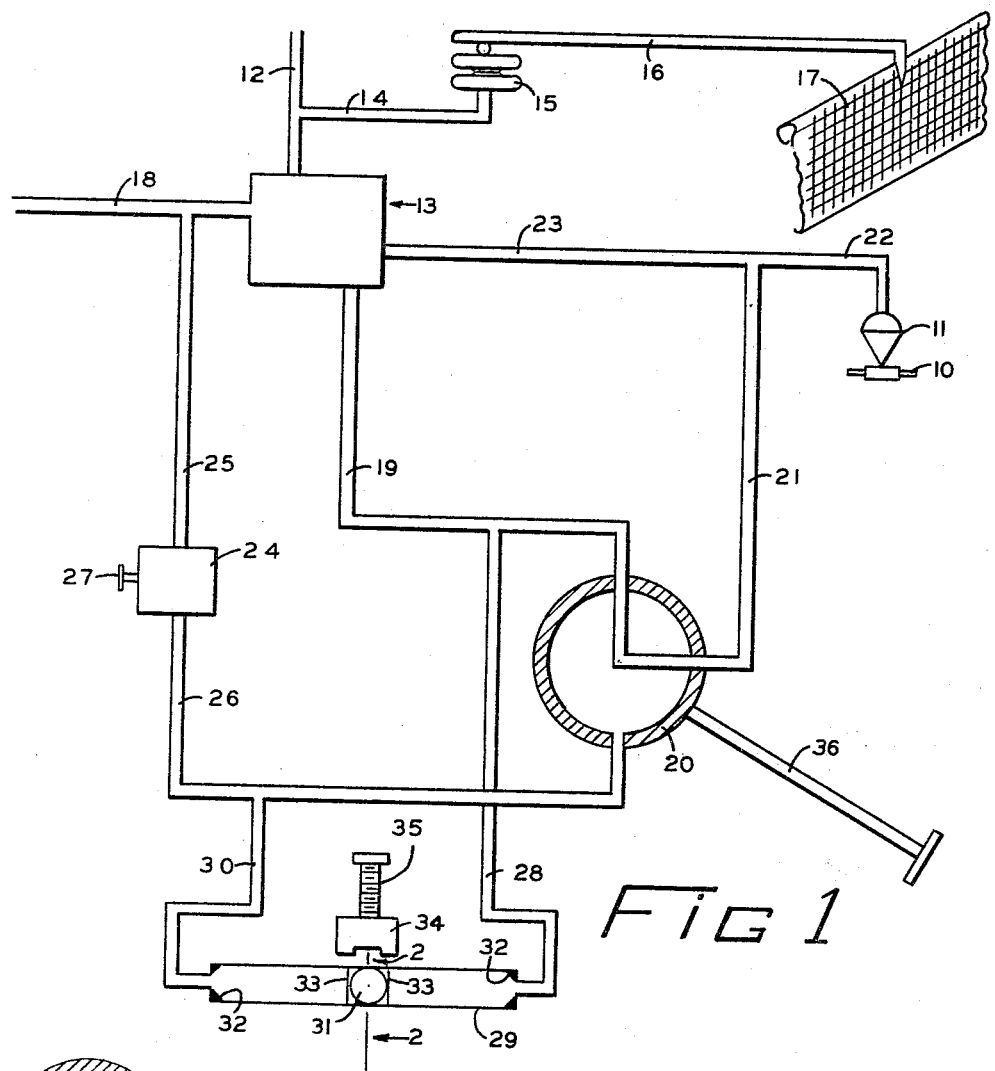
Fig 1
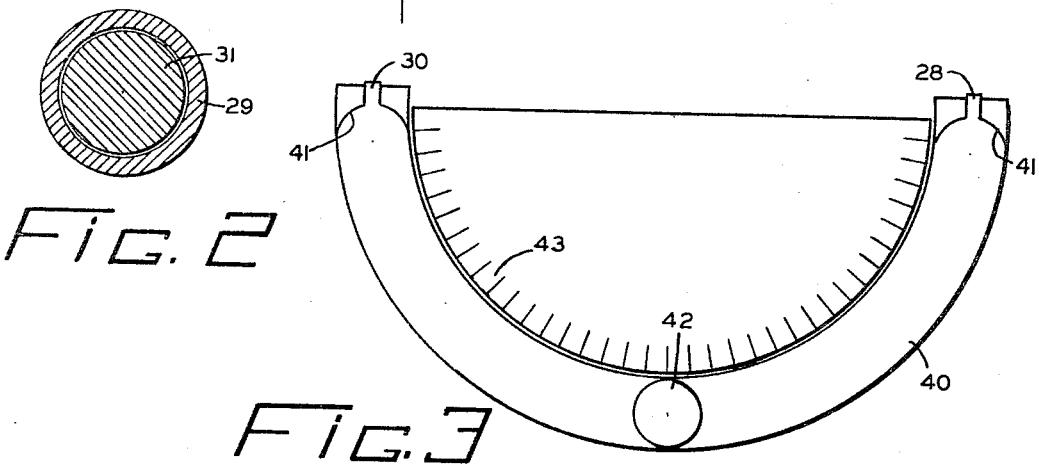
Fig. 2
Fig. 3

United States Patent Office 3,319,924
Patented May 16, 1967

3,319,924
DIFFERENTIAL PRESSURE INDICATOR AND PNEUMATIC CONTROL SYSTEM INCORPORATING THE SAME
James S. Wilson, Thomaston, Conn., assignor, by mesne assignments, to American Chain & Cable Company, Inc., New York, N.Y., a corporation of New York
Filed July 1, 1964, Ser. No. 379,470
11 Claims. (Cl. 251—26)

This invention relates to fluid-pressure-actuated control apparatus and more particularly to a pneumatic control system for use in the automatic regulation of a wide variety of process variables.

While pneumatic control systems may incorporate widely different components, usually they incorporate a controller of one form or another which in response to variations in a measured variable provides an output pressure fluid whose pressure bears a predetermined relation to the value of the measured variable and may serve to operate automatically a pressure responsive utilization device. For purposes of illustration, consideration may be given to a system in which the temperature of a liquid filled tank is the measured variable and in response to variations in that temperature, a pressure actuated valve is controlled by the output of the controller and responds to variations in the output pressure of the controller to regulate the flow of a heating medium to the tank.

It is often necessary during the operation of such pneumatic control systems to effect manual control over the utilization device, e.g., the pressure actuated valve referred to. In order to effect manual control of the pressure actuated device, it is important that the pressure of the manually controlled pressure fluid supply be equalized with the pressure of the fluid at the output of the controller before the system is switched from automatic to manual control. Unless the pressure of the manually controlled pressure fluid is brought to a value substantially equal to that at the output of the controller and the input of the pressure actuated device, the latter will be caused to change position when the system is transferred from automatic to manual control. Similarly, when transfer is effected from manual to automatic control, the pressure actuated device would again undergo an undesired change in position if the output pressure of the controller is not first brought to a value equal to that of the manually controlled pressure fluid.

Various arrangements have hitherto been proposed for switching such systems from automatic to manual control. However, such arrangements have left much to be desired primarily because of shortcomings in the means provided for sensing and/or indicating pressure differential between the controller output pressure and the manually controlled pressure fluid. Hitherto, such arrangements have proven to be undesirably insensitive or, though sensitive to relatively small differentials, unduly complex so as to require careful maintenance and adjustment without providing the desired degree of reliability in service.

It is, therefore, a principal object of this invention to provide a control system of the above nature adapted to either automatic or manual operation and wherein transfer of function from either method to the other may be effected smoothly and without abrupt change in position of the pressure actuated control device.

A further object is to provide such a system in which manually or automatically controlled pressure fluids may be fed at will to the pressure actuated device and in which the pressures of the two fluids may be readily brought into substantial equality.

A more specific object of this invention is to provide such a system in which not only may the pressures of the manually and automatically controlled pressure fluids be readily adjusted to avoid disturbing the position of the pressure actuated device when the system is switched between manual and automatic control but also the sensitivity of the system to differences in the pressures of the two fluids may be readily adjusted.

Yet another object is to provide an improved differential pressure indicator of exceedingly simple construction, which is highly reliable and trouble free in operation and which is capable of sensing and indicating a pressure differential between two fluids with a high degree of sensitivity.

In a pneumatic control system in accordance with the present invention, the manually controllable pressure fluid is led into one end of a conduit while the automatically controllable pressure fluid is led into the other. A freely movable member is located within the conduit and has one side exposed to the manually controlled pressure fluid and its opposite side exposed to the automatically controlled pressure fluid. Means are provided for controlling the threshold value of the differential between the pressures of the two fluids to which the movable member responds and by which it is deflected from a predetermined zero position in the conduit.

In accordance with a preferred embodiment of the present invention, the movable member is in the form of a ball made of magnetic material and means are provided for establishing a magnetic field which restrains the ball against displacement from its zero position unless the differential between the two pressures to be balanced exceeds a predetermined value. Means may also be provided for adjusting the intensity of the magnetic field so that the sensitivity may be adjusted to detect a wide range of pressure differentials down to .01 p.s.i. or less.

Instead of using a magnetic field to bias the movable member to its zero position, I may use the force of gravity by forming the conduit for the movable member in a suitable arc so that in the absence of a sufficiently great pressure differential between the two pressure fluids the movable member under the influence of gravity is held at the zero position at the bottom of the curved conduit. While the sensitivity of this arrangement is not so readily controllable as in my preferred embodiment, it may be utilized to provide a measure of the differential pressure between the two pressure fluids when such is desired.

Further objects and advantages of the present invention will be apparent from the following description and the accompanying drawings, in which:

FIGURE 1 is a diagrammatic view, partially in section, of a typical control installation embodying the present invention;

FIGURE 2 is a cross sectional view taken along the line 2—2 of FIGURE 1; and

FIGURE 3 is a sectional view of another embodiment of the present invention.

While the present invention will be described in detail with the aforementioned assumed control problem of maintaining a constant temperature in a tank and with air as the pressure fluid, it is to be understood that this is solely for the purpose of illustration and it is not intended to limit the present invention thereto.

Referring now to FIGURE 1, a suitable heating medium flowing in a conduit 10 is controlled by a pressure actuated valve 11. A suitable temperature sensitive element is exposed to the contents of the tank (not shown) and by thermometric means well known in the art, the effect of temperature changes in the tank is converted to signals representative of the measured variable, in this case the temperature. The signals as represented by variations in the pressure of a pressure fluid are fed through conduit 12 to the input of a controller 13 and may also be fed through a conduit 14 to a pressure sensitive element 15 provided with a pen or stylus 16 adapted to produce a continuous record on a moving graduated chart 17.

The details of construction of the controller 13 form no part of the present invention and, therefore, need not be described in detail here. Suffice it to say, that it may take any one of several forms, and, for example, may be of similar construction to that described in U.S. Patent No. 3,095,003. Suffice it to say here that the controller, through conduit 18, is connected to a source of air under pressure and is so constructed as to provide, in response to the measured variable, an output pressure in the conduit 19 which serves to correspondingly actuate the pressure actuated valve 11 which controls conduit 10. As shown, conduit 19 communicates through transfer valve 20, the latter being shown in its automatic position, with conduit 21 which is in turn connected to conduit 22 communicating with the top of the valve 11. As described in said Patent No. 3,095,003, the controller may include a feed back unit as is well understood in the art and connection is provided through conduit 23 between the feed back element of the controller 13 and the top of valve 11.

A manual pressure regulator 24 of conventional construction is connected to the air supply conduit 18 by conduit 25 and through conduit 26 communicates with the transfer valve 20. The pressure of the supply in conduit 26 is manually adjustable to the desired value by means of an adjusting screw 27, a suitable scale (not shown) being provided.

Conduit 19, in which the output pressure fluid from controller 13 flows, is connected to a conduit 28 which in turn communicates with one end of a tube 29. The other end of tube 29 communicates through a conduit 30 with conduit 26. Tube 29 is formed of nonmagnetic material and is preferably formed of transparent glass or a suitbale clear plastic. Positioned within the tube 29, is a freely movable indicating member 31, which is preferably a spherically shaped ball formed of ferromagnetic material, such as a suitable stainless steel alloy. While the dimensions of the tube 29 and ball 31 are not at all critical and may take any convenient value, the diameter of the ball 31 should closely fit the internal diameter of the tube 29 which is preferably cylindrical throughout its operating length. Preferably, the clearance between ball 31 and the interior wall of tube 29 should be no geater than about .005 inch and may be made as close as desired, limited only by excessive friction between the ball and the interior surface of the tube. As will be more fully pointed out hereinafter, the adoption of a suitable clearance between the ball 31 and the tube 29 serves as one way of establishing control of the sensitivity of the apparatus. Preferably, the clearance between the ball 31 and tube 29 should be selected such as to fall within the range of about .001 inch to about .005 inch. As indicated at 32, the opposite ends of the tube 29 are suitably formed as valve seats upon which the ball 31, in either of its extreme positions, may seat to prevent the escape of pressure fluid from or the flow of pressure fluid to conduit 19 when the manually and automatically controlled pressure fluids are out of balance and the ball 31 is at the corresponding end of the tube 29.

Conveniently, the midportion of the tube 29 is selected as the zero position for ball 31 and means are provided for establishing a magnetic field which, in the absence of a sufficiently great disturbing force, serves to hold the ball 31 in its central position indicated by suitable graduations 33 on the tube 29. The magnetic means may be in the form of a permanent magnet 34, as shown, provided with an adjusting screw 35 for selectively positioning the magnet relative to the tube 29, thereby providing a ready means for adjusting the sensitivity of the system. A greater differential pressure is required to deflect the ball 31 as the magnetic force restraining the ball is increased by positioning the magnet 34 closer to the tube and ball. If desired, an electromagnet or other suitable means may be utilized for establishing the biasing magnetic field.

As shown in the drawing, transfer valve 20 is positioned to maintain the automatic function of the system and by means of its operating shaft 36, the valve may be readily shifted to provide manual control. In operation, when the system is operating automatically as shown and it is desired to shift to manual control the position of the ball 31 in tube 29 is inspected and unless it is in its central position as shown in the drawing, the manual regulator 24 is adjusted before transfer valve 20 is shifted. When the ball 31 is at the right end of the tube 29, the pressure in conduits 26 and 30 is greater than that in conduits 19 and 28 plus the tolerable differential set by the position of the magnet 34. The regulator 24 is then adjusted by means of its adjusting screw 27 to reduce the pressure in conduits 26 and 30 and in the tube 29 on the left side of the ball 31 so that the ball is shifted to the midportion of tube 29 and until the differential between the pressures at the opposite ends of the tube 29 is low enough so that the ball is held between the graduations 33 by the magnetic field of the magnet 34. Now when the operating shaft 36 of the transfer valve 20 is operated to provide communication between conduits 21 and 26, no bump or undesired movement of the valve 11 is caused.

After operation under manual control, when it is desired to shift to automatic control, the position of the ball 31 in the transparent tube 29 is again inspected and if the ball is in its midposition, then the operating shaft of the transfer valve may be operated to shift from manual to automatic operation. However, this is usually not the case but it is only necessary to manually adjust the set point of the controller to either raise or lower the output pressure thereof in conduits 19 and 28 to shift the ball 31 from the left or right end extremity of tube 29 as the case may be. Once the ball 31 is again held by the magnetic field in its zero position, the pressure in conduit 19 has been equalized with that being fed to conduit 21 from conduit 26 through the transfer valve. Now the transfer valve may be shifted from its manual to its automatic position thereby switching over to automatic function without disturbing the position of the valve 11.

Some control of the sensitivity of ball 31 to pressure differentials between the air admitted to the opposite ends of tube 29 is afforded by the selected clearance between the ball and the interior of tube 29. Additional and fine adjustment of the sensitivity of the ball 31 to the pressure differential that may exist at the opposite ends of the tube 29 is afforded by adjustment of screw 35 which serves to shift the magnet 34 relative to the tube. As has been pointed out, the system may thus be adjusted to respond to pressure differentials as low as .01 p.s.i. or less.

Instead of the arrangement shown in FIGURE 1, I may, as shown in FIGURE 3, use a curved length of transparent tubing 40 which is provided with valve seats 41 at its opposite ends. The tube 40 is connected to conduits 30 and 28 at its opposite ends as was described in connection with tube 29. Movable within tube 40 is a ball 42, the clearance between the ball 42 and tube 40 conforming to that described in connection with tube 29 and ball 31. The remainder of the system is as was described in connection with FIGURE 1, including the connections to the transfer valve 20 and will, therefore, not be repeated here. The curved tube 40 is vertically disposed so that in the absence of a disturbing force and under the influence of gravity ball 42 will normally take the position shown in FIGURE 3 at the bottom of tube 40. In this arrangement, the force of gravity maintains ball 42 in its zero position until the pressure differential between tubes 28 and 30 becomes large enough to deflect the ball 42 upwards against the force of gravity. Transfer from manual to automatic or from automatic to zero position, and said tubular member having valve seats formed therein adjacent to each of the opposite end portions thereof adapted to cooperate with said ball-shaped indicating member and interrupt communication between the end portion of the tubular member communicating with the lesser of said fluid pressures upon the occurrence of a differential pressure greater than said predetermined amount and deflection of said indicating member to its corresponding extreme position in response thereto.

References Cited by the Examiner

UNITED STATES PATENTS

| | | |
|---|---|---|
| 2,054,900 | 9/1936 | Friedmann et al. |
| 2,202,286 | 5/1940 | Gorrie _____ 251—26 X |
| 2,413,352 | 12/1946 | Hulsberg _____ 73—205 |
| 2,637,342 | 5/1953 | Shannon _____ 251—26 |
| 3,105,514 | 10/1963 | Mollick _____ 251—26 |
| 3,126,739 | 3/1964 | Whitehill _____ 73—205 |

M. CARY NELSON, *Primary Examiner.*

E. K. FEIN, *Assistant Examiner.* manual function is carried out as was described in connection with FIGURE 1. Here, however, the sensitivity of the ball 42 to pressure differential between the opposite ends of the tube 40 is determined by the curvature of the tube, the steeper the gradient, the greater the pressure differential required to displace ball 42 upward along either side of the tube. Thus, by gradually increasing the gradient presented by the tube from its lowermost portion to its end portions which may, as shown, extend substantially vertically, the position of the ball relative to the scale 43 provides a convenient indication of the pressure differential existing at the opposite ends of the tube 40. Depending upon whether the ball 42 is in the left or right arm of tube 40, the pressure of the fluid in conduit 28 or in conduit 30 is indicated to be the greater of the two.

The terms and expressions which have been employed are used as terms of description and not of limitation, and there is no intention, in the use of such terms and expressions of excluding any equivalents of the features shown and described or portions thereof, but it is recognized that various modifications are possible within the scope of the invention claimed.

I claim:

1. In a fluid pressure control system, control means for automatically providing at its output a first fluid pressure representative of the magnitude of a measured variable, fluid pressure actuated means and means including transfer means for providing communication between the output of said control means and said fluid pressure actuated means, adjustable means for providing at its output a second fluid pressure the value of which is adjustable at will, means connecting the output of said adjustable means with said transfer means, said transfer means having two positions one position providing communication between the output of said control means and said fluid pressure actuated means and a second position providing communication between the output of said adjustable means and said fluid pressure actuated means, means for selectively shifting said transfer means to one of its two positions, and means for indicating when the pressure differential between said first and second fluid pressures exceeds a predetermined amount including a tubular member having its opposite end portions connected to said respective outputs in shunt with said transfer means, said indicating means further including an indicating member in said tubular member and deflectable in opposite directions longitudinally relative to said tubular member from a zero position when said pressure differential exceeds said predetermined amount in accordance with which of said first and second fluid pressures is the greater.

2. A fluid pressure control system as set forth in claim 1, wherein means are provided for interrupting communication between the end portion of said tubular member communicating with the lesser of said fluid pressures upon the occurrence of a differential pressure greater than said predetermined amount and deflection of said indicating member to its corresponding extreme position in response thereto.

3. A fluid pressure control system as set forth in claim 1, wherein said indicating member is formed of magnetic material, and said pressure differential indicating means includes magnetic means for biasing said indicating member in its zero position against pressure differentials less than said predetermined amount.

4. A fluid pressure control system as set forth in claim 3, comprising means for adjusting the biasing force of said magnetic means whereby to vary said predetermined amount of said pressure differential required to deflect said indicating member from its zero position.

5. A fluid pressure control system as set forth in claim 4, wherein said indicating member is ball-shaped, closely fitting and movable along said tubular member under the influence of a pressure differential across it greater than said predetermined amount.

6. A fluid pressure control system as set forth in claim 1, including means for measuring the pressure differential between said first and second fluid pressures.

7. A fluid pressure control system as set forth in claim 1 wherein said tubular member is substantially U-shaped and is disposed substantially in a vertical plane with its midportion lowermost and forming the zero position for said indicating member and with its opposite end portions extending upwardly from its midportion, and said indicating member is ball-shaped and is held by the force of gravity in said zero position in the midportion of said tubular member in the absence of a differential pressure greater than said predetermined amount.

8. A fluid pressure control system as set forth in claim 7 wherein the curvature of said tubular member on opposite sides of its vertical center line progressively varies so that the gradient presented to said indicating member increases with its deflection from said zero position.

9. A fluid pressure differential indicator for connection between two sources of fluid under pressure, comprising a tubular member forming a longitudinal passage and adapted to be connected at its opposite end portions to respective ones of said sources of fluid under pressure, an indicating member formed of magnetic material in said tubular member and deflectable from a zero position in opposite directions longitudinally relative to said tubular member, said indicating member extending transversely in said tubular member and closely fitting the same, and magnetic means for biasing said indicating member against deflection from said zero position in the absence of a pressure differential across it greater than a predetermined amount.

10. A fluid pressure differential indicator for connection between two sources of fluid under pressure, comprising a tubular member forming a longitudinal passage and adapted to be connected at its opposite end portions to respective ones of said sources of fluid under pressure, an indicating member formed of magnetic material in said tubular member and deflectable from a zero position in opposite directions longitudinally relative to said tubular member, said indicating member extending transversely in said tubular member and closely fitting the same, magnetic means for biasing said indicating member against deflection from said zero position in the absence of a pressure differential across it greater than a predetermined amount, and means for adjusting the biasing force of said magnetic means whereby to vary said predetermined amount of said pressure differential required to deflect said indicating member from its zero position.

11. A fluid pressure differential indicator for connection between two sources of fluid under pressure, comprising a transparent tubular member forming a longitudinal passage and adapted to be connected at its opposite end portions to respective ones of said sources of fluid under pressure, a ball-shaped indicating member formed of magnetic material in said tubular member and deflectable to two extreme positions from a zero position in opposite directions longitudinally relative to said tubular member, said ball-shaped indicating member closely fitting said tubular member, magnetic means for biasing said indicating member against deflection from said zero position in the absence of a pressure differential across it greater than a predetermined amount, means for adjusting the biasing force of said magnetic means whereby to vary said predetermined amount of said pressure differential required to deflect said indicating member from its